United States Patent [19]
Nogiwa et al.

[11] Patent Number: 5,574,534
[45] Date of Patent: Nov. 12, 1996

[54] APPARATUS FOR DETERMINING NOISE FACTOR OF OPTICAL AMPLIFIER

[75] Inventors: Seiji Nogiwa, Tokyo; Kazuo Aida, Yokohama; Kiyoshi Nakagawa, Miura-gun, all of Japan

[73] Assignees: Ando Electric Co., Ltd.; Nippon Telegraph and Telephone Corporation, both of Tokyo, Japan

[21] Appl. No.: 547,664

[22] Filed: Oct. 24, 1995

[30] Foreign Application Priority Data

Oct. 24, 1994 [JP] Japan .................................. 6-258401

[51] Int. Cl.$^6$ ........................... H01S 3/00; H04B 10/08; H04B 10/02
[52] U.S. Cl. ......................... 359/337; 359/341; 359/110; 359/177
[58] Field of Search .................................. 359/337, 341, 359/110, 177

[56] References Cited

U.S. PATENT DOCUMENTS

5,282,074  1/1995  Miyazaki et al. ........................ 359/174
5,471,334  11/1995  Masuda et al. ........................ 359/177
5,521,751  5/1996  Aida et al. ............................. 359/337

*Primary Examiner*—Mark Hellner
*Attorney, Agent, or Firm*—Finnegan, Henderson, Farabow, Garrett & Dunner, L.L.P.

[57] ABSTRACT

A noise determination apparatus for simple and precise determination of a noise factor of an optical fiber amplifier is presented. An optical pulse Pin is inputted via an optical coupler 2 into an optical looping circuit 14, and for every loop around the circuit 14, the spontaneous emission light generated in a rare-earth doped optic fiber amplifier 4 is integrated. The amplitude of the light intensity of the optical pulse train outputted from the optical splitter 3 decreases as the looping cycles are increased, and ultimately, the light intensity of the accumulated spontaneous emission light becomes equal to that of the optical pulse train. The pulse train outputted from the photodetector 7 diminishes. The number of pulses in the looping process from the initial pulse train to the expiration event are counted by means of a pulse counting device 8. Based on the count, the noise factor NF of the optical amplifier 4 is calculated using the gain of the optical amplifier 4, the bandwidth of the band-pass filter 5, oscillation frequency of light and the pulse intensity.

8 Claims, 8 Drawing Sheets

APPARATUS FOR DETERMINING NOISE FACTOR OF OPTICAL AMPLIFIER

BACKGROUND OF THE INVENTION

1. Field of the Invention

The present invention relates in general to optical fiber amplifier for amplifying optical signals in the field of optical communications, optical information processing and optical measurements and relates in particular to an apparatus for measuring a noise factor of an optical fiber amplifier.

2. Description of the Related Art

Presently, optical fiber amplifiers based on optical fibers doped with a rare-earth element, such as erbium (Er), are widely used, and are based on utilization of induced emission of inter-band energy release. Such optical amplifiers based on rare-earth element doped optical fiber (shortened to optical amplifier herein below) generate noise which is characterized by a noise factor. Methods for measuring the noise factor in an optical amplifier can be divided into two types: those based on electrical methods; and those based on optical methods. The electrical methods of determining the noise factor are based on injecting a high intensity modulated light into an optical amplifier whose output is monitored by a photodetector, and a ratio of noise to carrier signal strengths obtained by an electrical spectrum analyzer is used to calculate a noise factor. Optical methods of determining a noise factor are based on measuring the gain of an optical amplifier in relation to the intensity of spontaneous emission light generated within the optical amplifier.

The electrical methods of determining the noise factor rely, in general, on low noises from the associated measuring devices such as the photodetector, and furthermore, if there is some optical reflection in the measuring system, a problem called beat noise, which is dependent on the optical distance between the reflecting surfaces, makes a precise determination of the noise factor impossible. Optical methods in general, suffer from a problem that precision determination is not possible when high intensity light is injected into an optical amplifier, because in such a case, the optical spectrum analyzer measures the result of spontaneous emission light superimposed on stray light. There is a further problem common to both of these methods that all the methods require the use of expensive instruments such as electrical or optical spectrum analyzer.

SUMMARY OF THE INVENTION

An object of the present invention is to provide a noise determination apparatus for determining a noise factor in an optical fiber amplifier readily and precisely. The object is achieved in an optical noise subject amplifier comprising: an optical looping circuit comprising an optical coupler, an optical bandpass filter; an optical attenuator; an optical splitter; and a subject amplifier, whose noise factor is to be determined, disposed in the optical looping circuit, wherein the optical attenuator attenuates an optical pulse so as to maintain a constant pulse intensity for each looping cycle in the optical looping circuit; an optical pulse generation means for generating one optical pulse having a pulse width shorter than a pulsing time and injecting the one optical pulse into the optical looping circuit through the optical coupler to loop around the optical looping circuit; a photodetector for converting an optical output pulse outputted from the optical looping circuit into an electrical pulse signal so as to generate a plurality of the electrical pulse signals for a respective number of looping cycles; a measuring means for measuring a result of looping cycles selected from a group consisting of a number of the plurality of electrical pulse signals, a duration time for a pulse train and a change in amplitude of the plurality of electrical pulse signals; wherein the noise factor is determined in relation to one of either the number of the plurality of electrical pulse signals, or the duration time For a pulse train and the pulsing time, or the change in amplitude of the plurality of electrical pulse signals and is calculated using the values of a gain of the subject amplifier, a bandwidth of the optical bandpass filter, a oscillation frequency of light, and a light intensity of the one optical pulse.

An aspect of the apparatus is that the optical attenuator is a variable optical attenuator.

Another aspect of the apparatus is that the pulse generation means is a variable wavelength generation means for controlling wavelengths of optical pulses, and the bandpass filter is a variable bandpass filter for controlling a filtered wavelength or a mean wavelength of a filtered band.

The final aspect of the apparatus is that the pulse generation means comprises a continuous light source and an optical switch for converting a continuous light into optical pulses; and the optical looping circuit includes an optical delay line for controlling a pulse width of the optical pulse.

According to the noise determination apparatus having the features presented above, one optical pulse inputted into the looping circuit through the optical coupler is amplified by the optical fiber amplifier, and continues looping within the looping circuit while losing the original intensity due to passing through the optical attenuator, the bandpass filter, the optical coupler and the optical splitter. For every looping cycle, spontaneous emission of light is generated within the optical fiber amplifier, and the intensity of the spontaneous emission light is integrated for each looping cycle. Thus, the intensity of the light outputted from the optical splitter increases with the number of looping cycles, and ultimately becomes equal to the intensity of the original optical pulse. Therefore, the noise factor of the optical fiber amplifier can be computed by knowing one of the following measurements: the number of pulses generated by the photodetector, or the duration time of the pulse train and the pulsing time, or changes in the amplitude of the optical pulse, together with the preset values of the gain of the optical fiber amplifier, bandwidth of the bandpass filter, oscillation frequency of light, and the light intensity of the original optical pulse.

Therefore, according to the configuration of the noise determination apparatus of the present invention, simple and precise determination of the noise factor is possible without experiencing the problems existing in the conventional methods, such as the beat noises caused by reflections in the optical systems and stray light effects for input of high intensity light, are avoided. The apparatus presents further advantage that expensive associated instruments such as a low-noise photodetector, an electrical or spectrum analyzers not required. The apparatus may be provided with a variable gain for the optical amplifier, thus permitting a determination of light intensity-dependence or gain-dependence of the noise factor. It is further possible to vary the wavelength of the optical pulse inputted into the optical looping circuit, thus permitting a determination off wavelength-dependency of the noise factor. It is further possible to provide a device so that pulse width of the optical pulse can be chosen freely to provide further flexibility and economy in performing the noise factor determination.

DESCRIPTION OF THE PREFERRED EMBODIMENTS

A first embodiment will be explained with reference to FIGS. 1, 2 and 3.

First Embodiment

Figure 1:
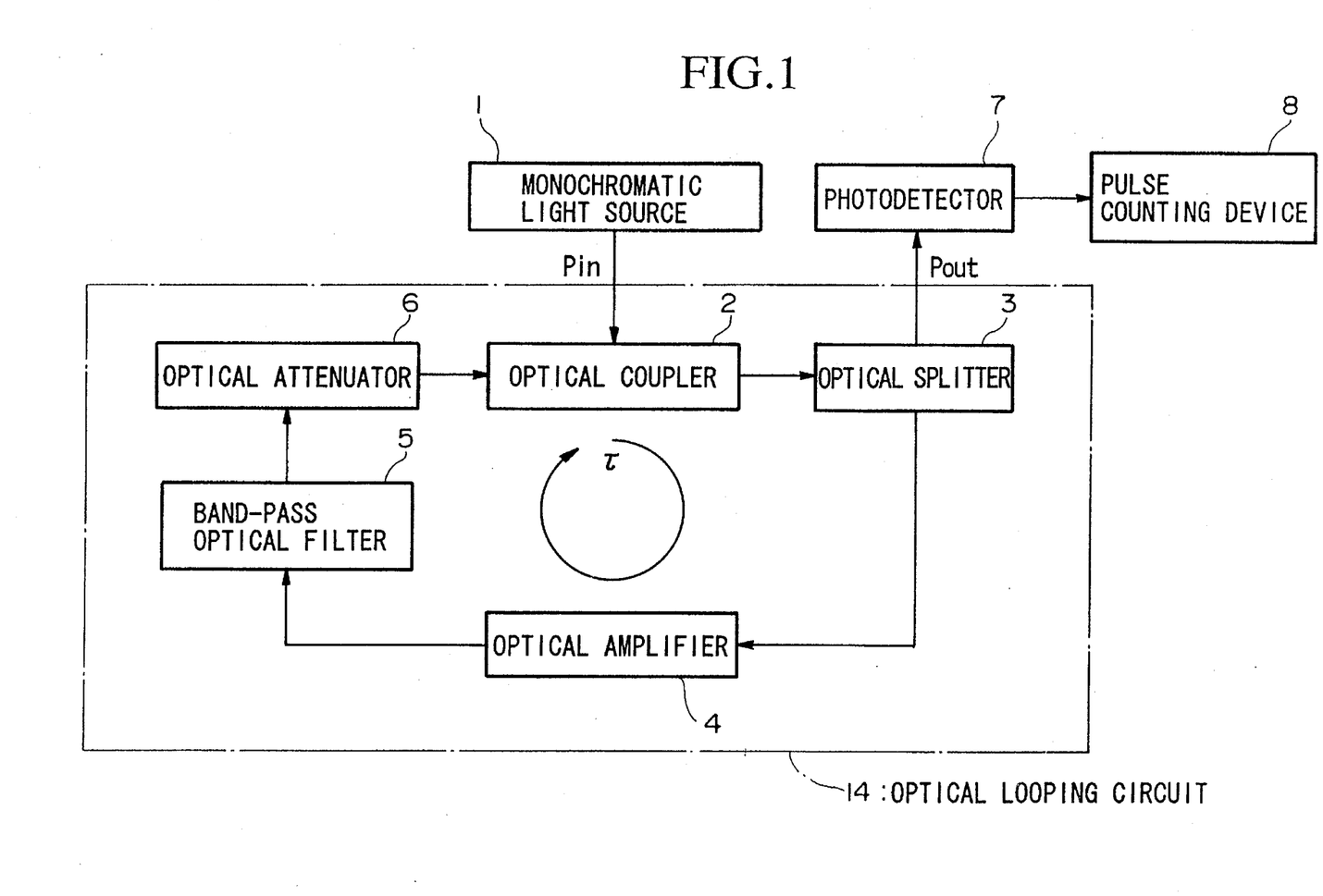
FIG. 1 is a block diagram of a first embodiment of the apparatus of the present invention for determining a noise factor of an optical amplifier.

FIG. 1 is a block diagram of a first embodiment of the noise determination apparatus of the present invention. A monochromatic light source 1 generates an optical pulse signal Pin, such as the one illustrated in (a) in FIG. 2, which is injected into an optical looping circuit 14. The optical looping circuit 14 comprises: an optical coupler 2; an optical splitter 3; an optical amplifier 4 whose noise factor is to be determined; a band-pass optical filter 5; and an optical attenuator 6. The optical pulse signal Pin makes a complete loop in the optical looping circuit 14 in a pulsing time τ. The pulse width of the optical pulse signal Pin is made to be less than the value of τ, as illustrated in (a) FIG. 2.

The optical coupler 2 couples an optical signal which loops around the optical looping circuit 14 with the pulse signal Pin from the monochromatic light source 1 and outputs the coupled signal. The optical splitter 3 outputs a part of the optical signal looping in the circuit 14 to the photo-detector 7. The optical amplifier 4 is an optical fiber amplifier whose structural configuration will be explained later. The bandpass filter 5 has a given bandwidth for passing signals of certain wavelengths, which includes the wavelength of the optical pulse signal Pin, and allows those signals of the optical pulse signal Pin which fall within the band to pass through. The optical attenuator 6 provides a looping signal with a given amount of attenuation. The amount of attenuation of the optical attenuator 6 is chosen such that an optical pulse signal looping around in the looping circuit 14 is restored to the original intensity after making a complete loop around the looping circuit 14. The photo-detector 7 converts an optical signal supplied by the optical splitter 3 into an electrical signal. A pulse counting device 8 counts the number of pulses, and may be a pulse counter which monitors the number of electrical pulses generated by the photodetector 7. The noise factor of the optical amplifier 4 is determined on the basis of the pulse numbers obtained by the pulse counting device 8.

Figure 3:
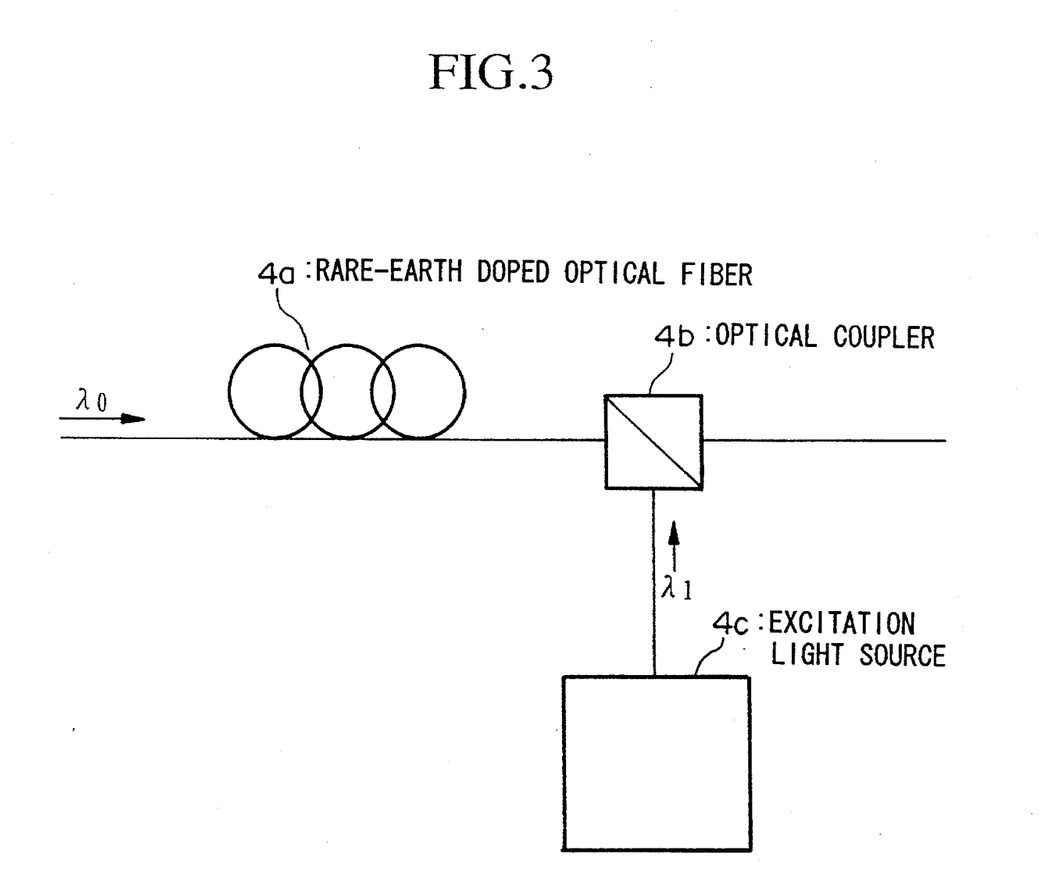
FIG. 3 is a schematic illustration of the essential components comprising an optical fiber amplifier.

FIG. 3 shows the configuration of the optical amplifier 4 whose noise factor is to be determined (referred to as the subject amplifier hereinbelow). The subject amplifier 4 comprises: a rare-earth doped optical fiber (shortened to optical fiber hereinbelow) 4a; an optical coupler 4b; and an excitation light source 4c. The amplification of an incoming signal λ0 is carried out by injecting an excitation light λ1 from the excitation light source 4c into the optical fiber 4a, in which induced emission of light takes place, and outputting the incoming signal λ0 from the optical coupler 4b.

Using the above configuration of the looping circuit 14 and operating the optical attenuator 6 so that the original intensity is restored after an optical pulse signal loops once around the looping circuit 14, it should be possible to loop around the optical pulse signal Pin (inputted from the monochromatic light source 1 into the optical coupler 2) infinitely. It should then be possible to generate at infinitum a light pulse train having a plurality of light pulses of equal light intensity. However, in actual practice, spontaneous emissions are generated within the subject amplifier 4, which cause the number of the optical pulse train to be finite, not infinite. This is explained in more detail below.

Figure 2A:
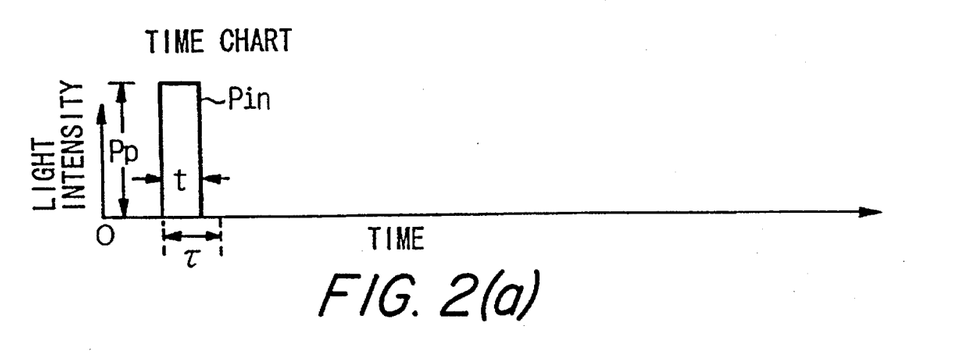
FIG. 2 shows various waveforms of the apparatus where: (a) shows an output waveform of an optical pulse Pin outputted from a monochromatic light source 1; (b) and (c) show waveforms outputted from the optical splitter 3.
Figure 2B:
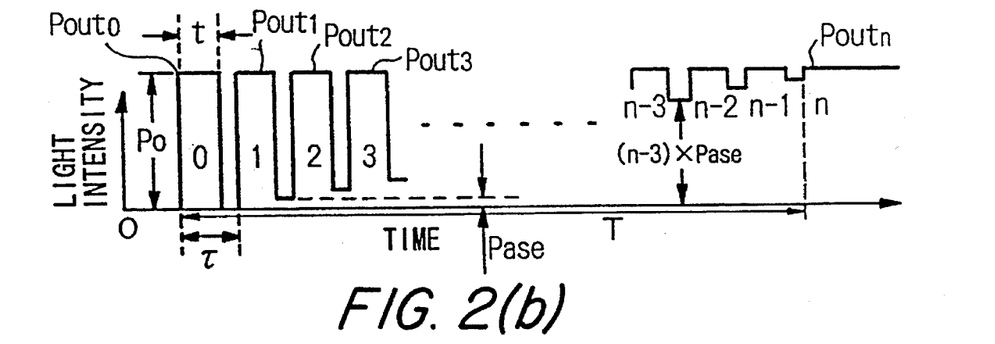
Figure 2C:
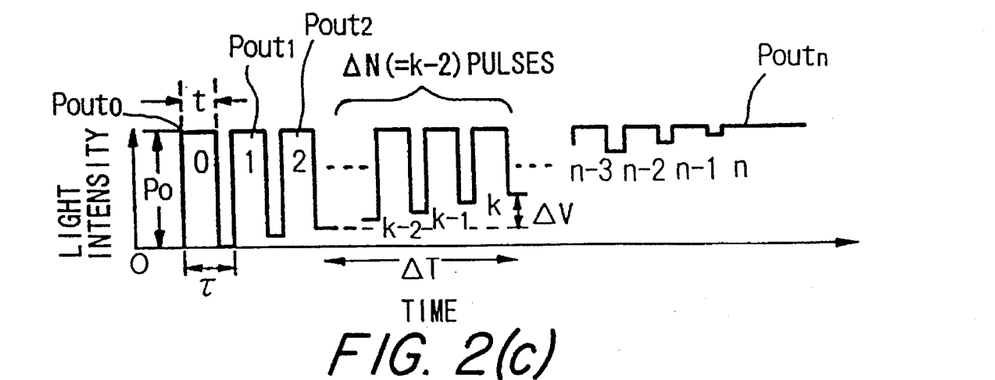

The waveform of the optical pulse train outputted from the optical splitter 3 is shown in (b), FIG. 2. The intensity of the optical pulse signal Pin outputted by the monochromatic light source 1 is denoted by Pp, and the light intensity of an optical pulse Pouto outputted directly from the optical splitter 3 without looping is denoted by Po. Also, any optical pulse which loops around the looping circuit 14 for any number of times, 1~n, before being outputted from the optical splitter 3 is denoted by Pout1~Poutn. It is shown in (b) in FIG. 2 that, after the signal Pin has looped around the looping circuit 14 once, the spontaneous emission light generated within the subject amplifier 4 raises the minimum light intensity from zero to some value, and this is observed in the minimum intensities of the optical pulses Pout1 and Pout2. Denoting the intensity after a first-round looping by Pase, it can be seen that after it has looped around the circuit 14 twice, the minimum light intensity of the signal Pin is 2×Pase. It follows that spontaneous light emission having an intensity of 2×Pase is outputted between an optical pulse Pout2 and an optical pulse Pout3. Similarly, spontaneous light emission having an intensity of 3×Pase is outputted between an optical pulse Pout3 and an optical pulse Pout4. Accordingly, with increasing cycles of looping, the intensities of the spontaneous emission light are integrated, and ultimately the minimum light intensity equals the light intensity Po of the light signal after Pouto~Poutn number of looping cycles.

In general, the intensity of the spontaneous emission light Pase of an optical amplifier and the noise factor (NF) are related by the following equation:

$$Pase = h \times v \times NF \times (G-1) \times B \tag{1}$$

where h is the Planck constant, v is the oscillation frequency of light, G is the gain of the optical amplifier, B is the bandwidth of the bandpass filter. As discussed above, when the minimum intensity of the pulse after one looping the looping circuit 14 is equal to the original intensity of the pulse, after n looping cycles, the intensity of the spontaneous emission light is n×Pase. Therefore, as shown in (b), FIG. 2, if it is assumed that the light intensity of the spontaneous emission light after n looping cycles (n×Pase) is the same as the intensity Po, From eqn (1), then the noise factor NF is expressed by the following equation:

$$NF = Po / \{n \times h \times v \times (G-1) \times B\} \tag{2}$$

In the first embodiment, the noise factor NF is calculated in accordance with eqn (2) by using each of the known values of: the gain G of the subject amplifier 4 (or the total loss of the looping circuit 14, excepting that of the subject amplifier 4); the bandwidth B of the bandpass filter 5; the oscillation Frequency ν of light; pulse light intensity Po outputted by the optical splitter 3; and the number of the optical pulses n obtained from the pulse counting device 8 such as a pulse counter.

Second Embodiment

Figure 4:
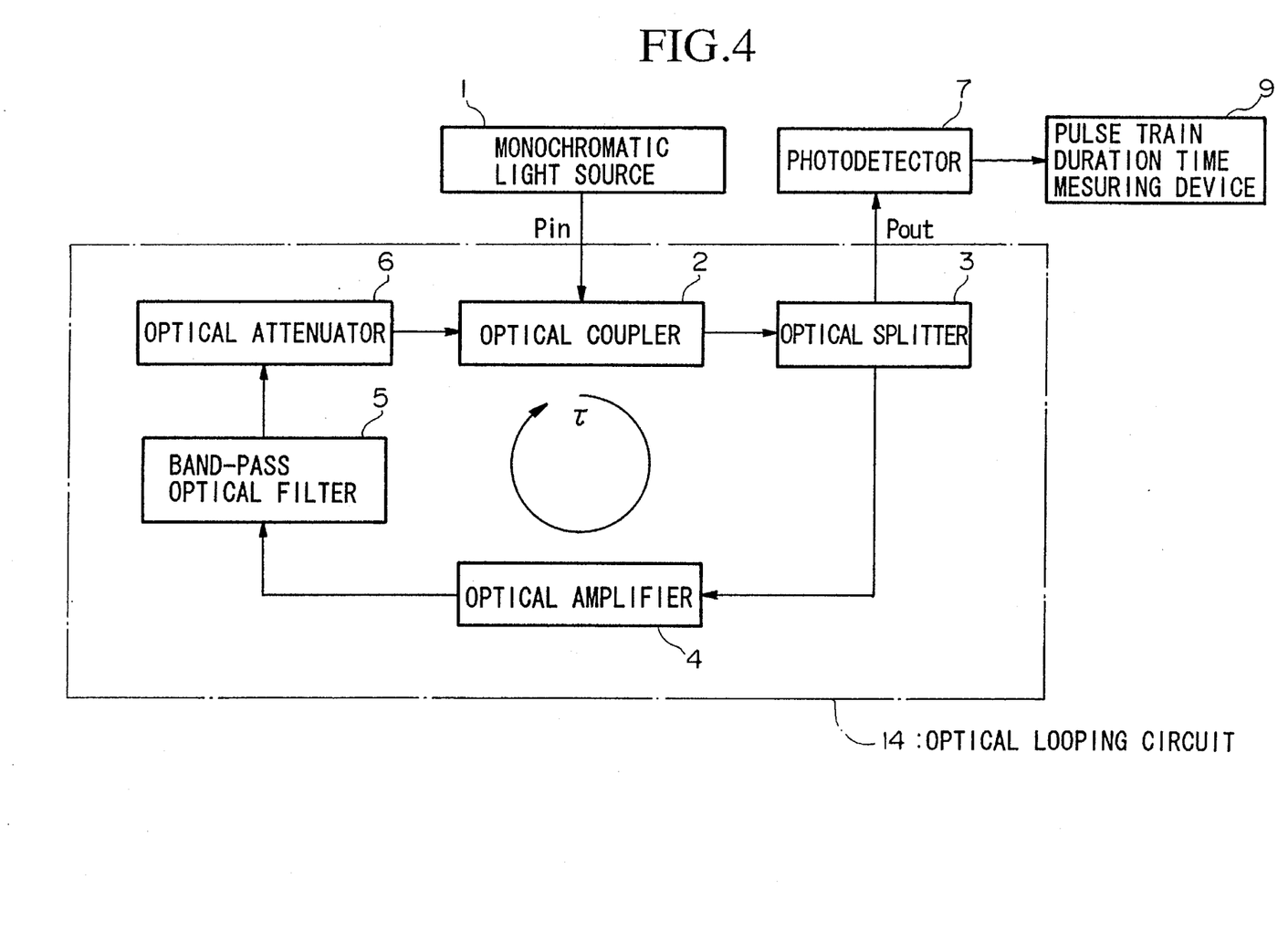
FIG. 4 is a block diagram of a second embodiment of the apparatus of the present invention for determining a noise factor of an optical amplifier.

FIG. 4 is a block diagram off a second embodiment of the NF determination apparatus for the subject amplifier of the present invention. The apparatus of the second embodiment utilizes a pulse train duration time measuring device 9 instead of the pulse counting device 8 in the first embodiment. As shown in (b) in FIG. 2, when the pulse train duration time T is measured by the device 9, the noise factor NF is calculated using the pulsing time τ, which is the time for a pulse to loop around the looping circuit 14 once, and the pulse train duration time T in accordance with the following equation:

$$NF=Po/\{(T/\tau)\times h\times \nu\times(G-1)\times B\} \quad (3)$$

In the second embodiment, the noise factor NF is calculated in accordance with eqn (3) by using each of the known values of: the gain G of the subject amplifier 4 (or the total loss of the looping circuit 14, excepting that of the subject amplifier 4); the bandwidth B of the bandpass filter 5; the oscillation frequency ν of light; pulse light intensity Po outputted by the optical splitter 3; the pulsing time τ and the pulse train duration time T.

Third Embodiment

Figure 5:
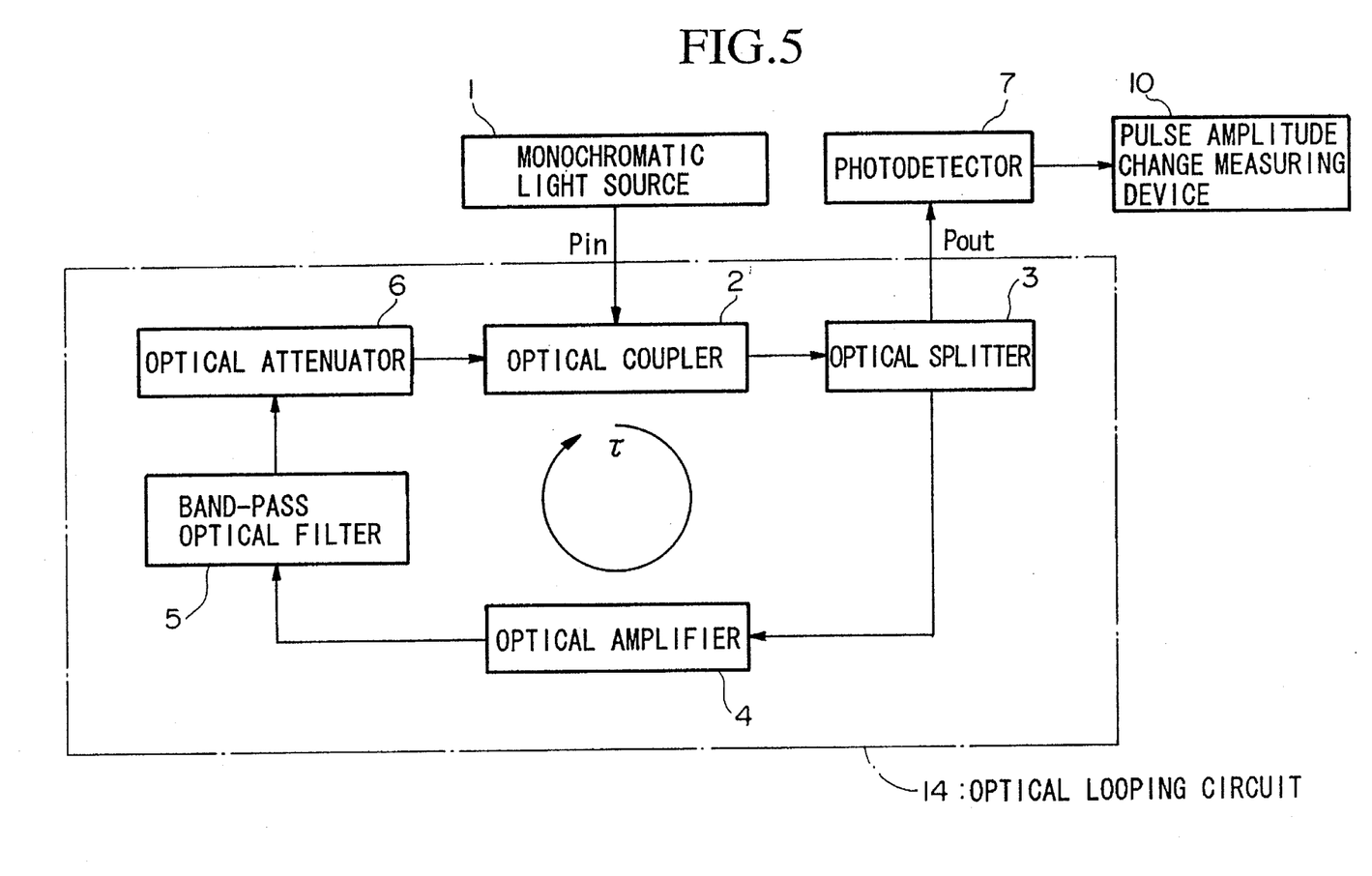
FIG. 5 is a block diagram of a third embodiment of the apparatus of the present invention for determining a noise factor of an optical amplifier.

FIG. 5 is a block diagram of a third embodiment of the NF determination apparatus for the subject amplifier of the present invention. The apparatus of the third embodiment utilizes a pulse amplitude change measuring device 10 to measure the amplitude of a plurality of pulses, instead of the pulse counting device 8 in the first embodiment or the pulse train duration time measuring device 9 in the second embodiment.

The waveforms off the pulse train outputted by the optical splitter 3 are shown in (c) in FIG. 2 to correspond with those shown in (b) in FIG. 2. As shown in (c), the pulse amplitude change measuring device 10 measures the amount of change ΔV in the minimum intensities within a time range ΔT or the number of pulses ΔN in the same time range ΔT.

The pulse amplitude change ΔV represents an amount of increase in the spontaneous emission light to correspond with the changes in the time range ΔT or in the number of pulses ΔN in the same time range. The noise factor NF is calculated from the following equation:

$$NF=\Delta V/\{(\Delta N\times h\times \nu\times(G-1)\times B\} \quad (4)$$

Also, because the time range ΔT can be expressed as a product of ΔN and the pulsing time τ, the noise factor NF can also be calculated in accordance with the following equation:

$$NF=\Delta V\times \tau/\{\Delta T\times h\times \nu\times(G-1)\times B\} \quad (5)$$

In the third embodiment, the noise factor NF is calculated in accordance with either eqn (4) or (5) by using each of the known values of: the gain G of the subject amplifier 4 (or the total loss of the looping circuit 14, excepting that of the subject amplifier 4); the bandwidth B of the bandpass filter 5; the oscillation frequency ν of light; pulse light intensity Po outputted by the optical splitter 3; and the time range ΔT measured by the pulse amplitude change measuring device 10 or the change in the pulse amplitude ΔV to correspond with the number of pulses ΔN.

Fourth Embodiment

Figure 6:
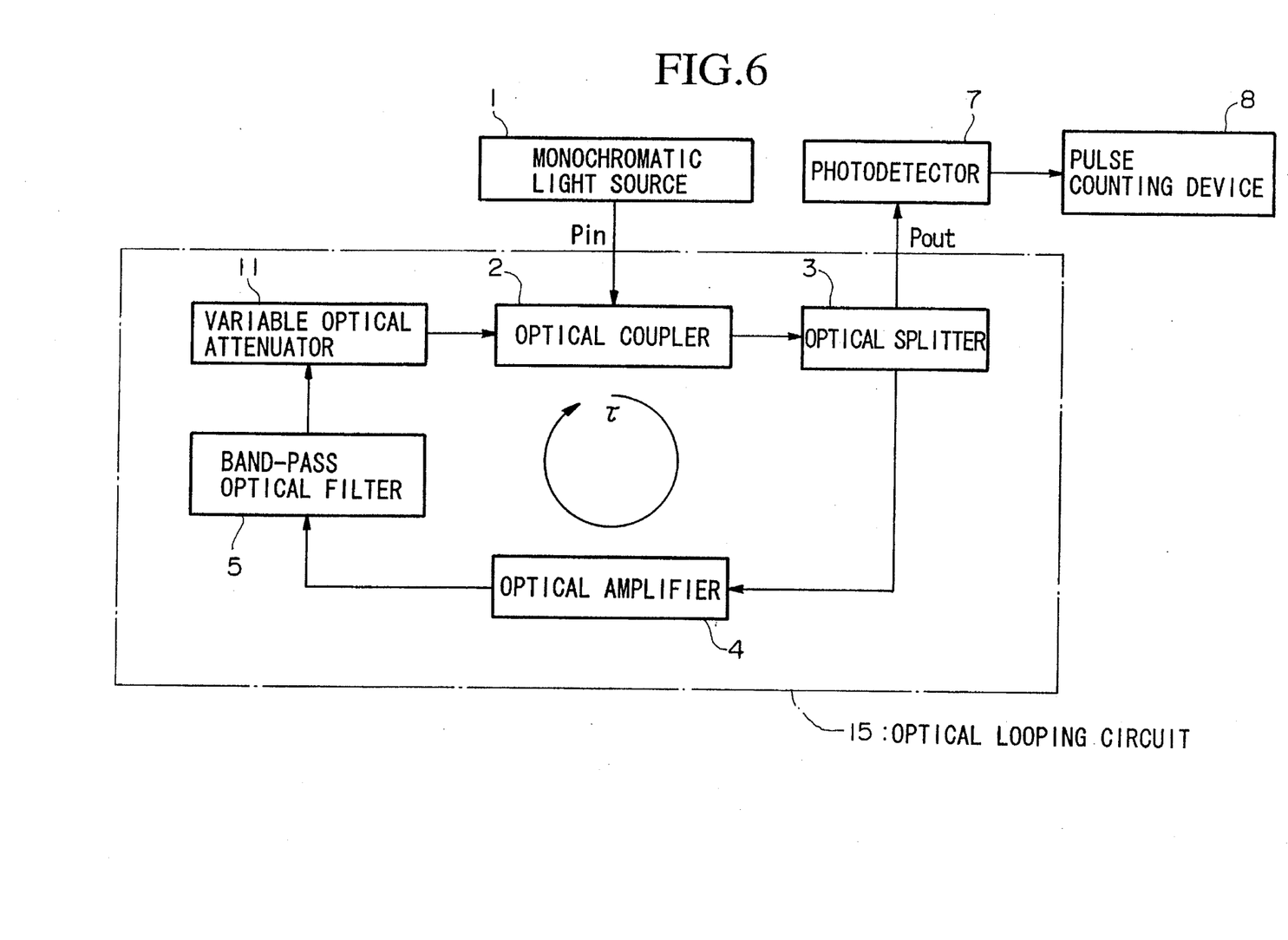
FIG. 6 is a block diagram of a fourth embodiment of the apparatus of the present invention for determining a noise factor of an optical amplifier.

FIG. 6 is a block diagram of a fourth embodiment of the NF determination apparatus for the subject amplifier of the present invention. The apparatus of the fourth embodiment utilizes a variable optical attenuator 11 instead of the optical attenuator 6 in the first embodiment. As shown in FIG. 3, the gain in the optical fiber 4a can be varied by altering the light intensity of the excitation light λ1 of the excitation light source 4c. In the fourth embodiment, the loss in the looping circuit 15 can be made equal to the gain in the subject amplifier 4 by adjusting the amount of attenuation in the variable optical attenuator 11. Therefore, by adjusting the light intensity of the excitation light λ1 into the subject amplifier 4 to vary the gain, it is possible to determine the dependence of the noise factor NF on the excitation light intensity or the gain in the amplifier.

Fifth Embodiment

Figure 7:
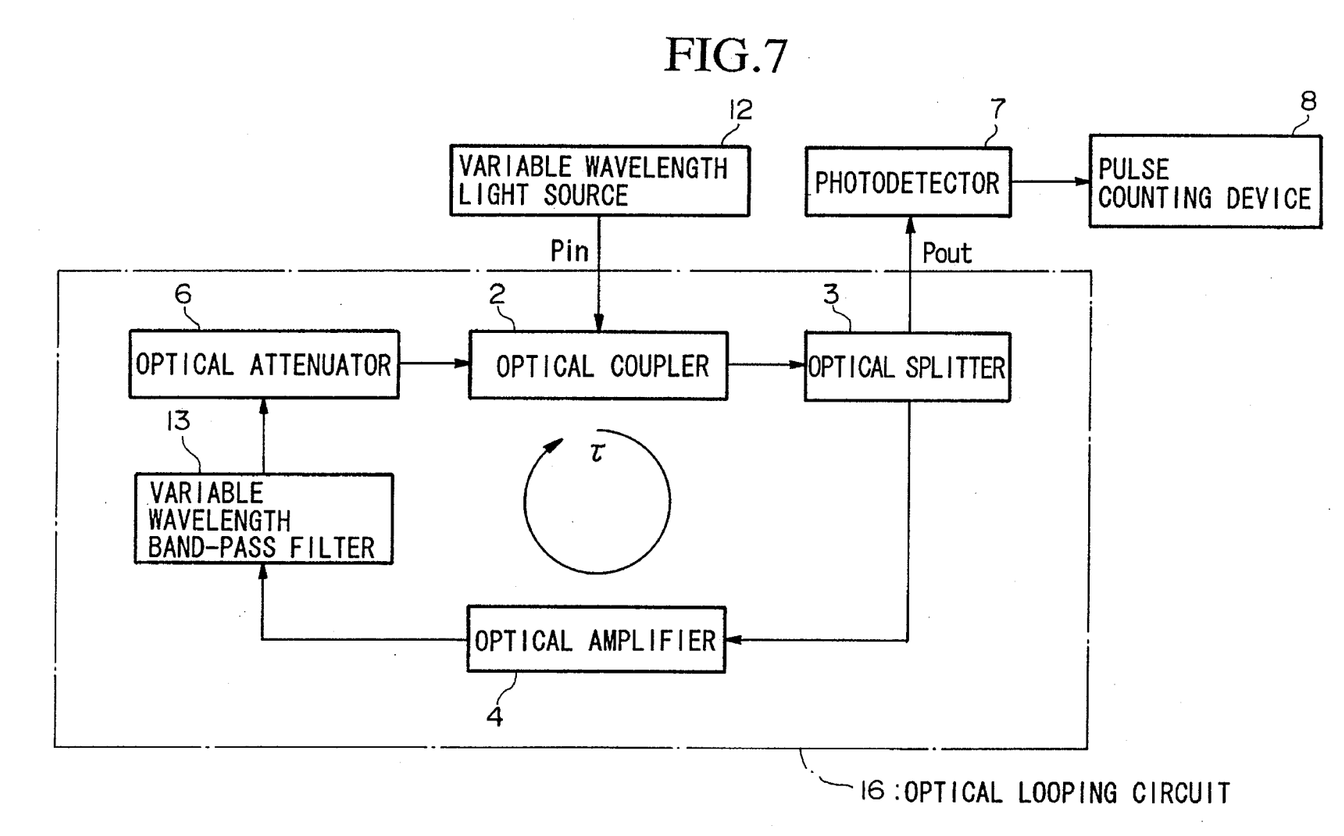
FIG. 7 is a block diagram of a fifth embodiment of the apparatus of the present invention for determining a noise factor of an optical amplifier.

FIG. 7 is a block diagram of a fifth embodiment of the NF determination apparatus for the subject amplifier of the present invention. The apparatus of the fifth embodiment utilizes a variable wavelength light source 12 instead of the monochromatic light source 1, as well as a variable wavelength bandpass filter 13 instead of the bandpass filter 5 having a fixed mean wavelength. According to this configuration, the wavelength of the optical pulses generated by the variable wavelength light source 12 inputted into the looping circuit 16 can be varied, and correspondingly, the bandwidth of the variable wavelength bandpass filter 13 can also be varied, to measure the noise factor under various wavelengths to determine the wavelength-dependence of the noise factor NF of the amplifier 4.

Sixth Embodiment

Figure 8:
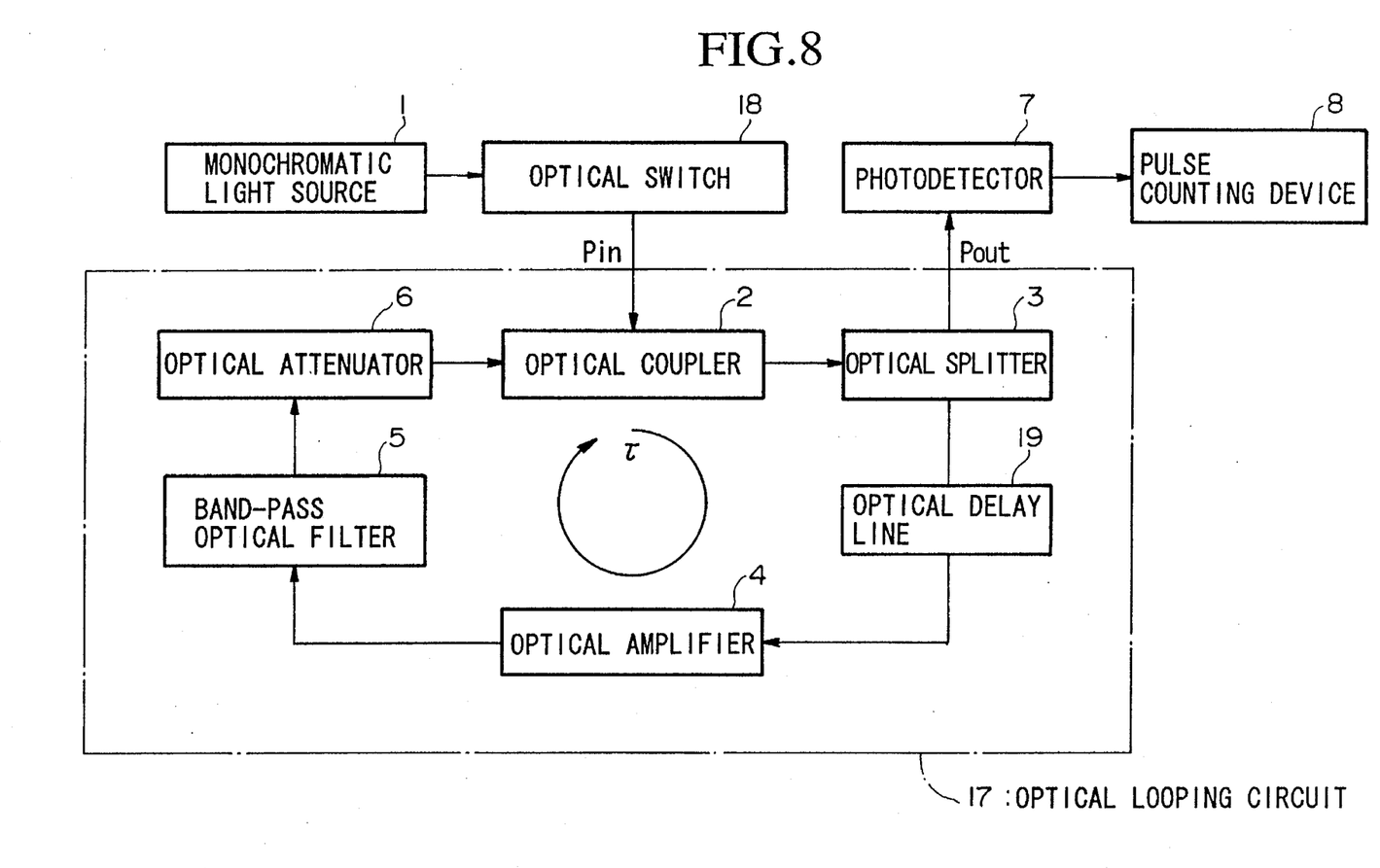
FIG. 8 is a block diagram of a sixth embodiment of the apparatus of the present invention for determining a noise factor of an optical amplifier.

FIG. 8 is a block diagram of a sixth embodiment of the NF determination apparatus for the subject amplifier of the present invention. The apparatus of the sixth embodiment provides an optical switch 18 and an optical delay line 19 to the apparatuses presented in first to fifth embodiments. For illustration, the NF determination apparatus for the subject amplifier presented in FIG. 8 is based on the apparatus shown in FIG. 1. In this apparatus, the monochromatic light source 1 outputs a continuous light signal, and the optical switch 18 converts this signal to pulses to output to the optical coupler 2. The optical delay line 19 provided in the looping circuit 17 adjust the pulse width t of an optical pulse generated by the optical switch 18 to be less than the pulsing time τ for the optical signal to loop around the looping circuit 17. This arrangement allows more freedom in choosing a pulse width t of the optical pulse, and eliminates a need to provide a facility to generate a rapid pulses within the monochromatic light source 1.

In the first to sixth embodiments presented above, the monochromatic light source 1 can be any one of: semiconductor distributed feedback laser, semiconductor distributed reflective laser, gaseous laser, solid laser or dye laser, to name a few. The optical switch 18 may be any of: acousto-optical switches, electro-optical switches or semiconductor optical switches, for example.

The positioning of the components used in the optical looping circuits 14, 15, 16 and 17 in the first to sixth embodiments is not limited to those shown in FIG. 1 and FIGS. 4 to 8.

What is claimed is:

1. A noise determination apparatus for determining a noise factor of an optical fiber amplifier comprising:

an optical looping circuit comprising an optical coupler, an optical bandpass filter; an optical attenuator; an optical splitter; and a subject amplifier, whose noise factor is to be determined, disposed in said optical looping circuit, wherein said optical attenuator attenuates an optical pulse so as to maintain a constant pulse intensity for each looping cycle in said optical looping circuit;

an optical pulse generation means for generating one optical pulse having a pulse width shorter than a pulsing time and injecting said one optical pulse into said optical looping circuit through said optical coupler to loop around said optical looping circuit;

a photodetector for converting an optical output pulse outputted from said optical looping circuit into an electrical pulse signal so as to generate a plurality of said electrical pulse signals for a respective number of looping cycles;

a measuring means for measuring a result of looping cycles selected from a group consisting of a number of said plurality of electrical pulse signals, a duration time for a pulse train and a change in amplitude of said plurality of electrical pulse signals;

wherein said noise factor is determined in relation to one of either said number of said plurality of electrical pulse signals, or said duration time for a pulse train and said pulsing time, or said change in amplitude of said plurality of electrical pulse signals, and is calculated using the values of a gain of said subject amplifier, a bandwidth of said optical bandpass filter, a oscillation frequency of light, and a light intensity of said one optical pulse.

2. A noise determination apparatus as claimed in claim 1, wherein said optical attenuator is a variable optical attenuator.

3. A noise determination apparatus as claimed in claim 1, wherein said pulse generation means is a variable wavelength generation means for controlling wavelengths of optical pulses, and said bandpass filter is a variable bandpass filter for controlling a filtered wavelength or a mean wavelength of a filtered band.

4. A noise determination apparatus as claimed in claim 2, wherein said pulse generation means is a variable wavelength generation means for controlling wavelengths of optical pulses, and said bandpass filter is a variable bandpass filter for controlling a filtered wavelength or a mean wavelength of a filtered band.

5. A noise determination apparatus as claimed in claim 1, wherein said pulse generation means comprises a continuous light source and an optical switch for converting a continuous light into optical pulses; and said optical looping circuit includes an optical delay line for controlling a pulse width of said optical pulse.

6. A noise determination apparatus as claimed in claim 2, wherein said pulse generation means comprises a continuous light source and an optical switch for converting a continuous light into optical pulses; and said optical looping circuit includes an optical delay line for controlling a pulse width of said optical pulse.

7. A noise determination apparatus as claimed in claim 3, wherein said pulse generation means comprises a continuous light source and an optical switch for converting a continuous light into optical pulses; and said optical looping circuit includes an optical delay line for controlling a pulse width of said optical pulse.

8. A noise determination apparatus as claimed in claim 4, wherein said pulse generation means comprises a continuous light source and an optical switch for converting a continuous light into optical pulses; and said optical looping circuit includes an optical delay line for controlling a pulse width of said optical pulse.

\* \* \* \* \*